(12) United States Patent
Yang et al.

(10) Patent No.: US 8,949,139 B2
(45) Date of Patent: Feb. 3, 2015

(54) APPARATUS AND METHOD FOR MANAGING SCHEDULE IN PORTABLE TERMINAL

(75) Inventors: Myung-Kyu Yang, Seoul (KR); Hong-Sik Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 12/468,396

(22) Filed: May 19, 2009

(65) Prior Publication Data
US 2009/0287531 A1    Nov. 19, 2009

(30) Foreign Application Priority Data

May 19, 2008    (KR) .................. 10-2008-0045965

(51) Int. Cl.
| | | |
|---|---|---|
| *G06Q 10/00* | (2012.01) | |
| *G06F 3/0488* | (2013.01) | |
| *G04G 9/00* | (2006.01) | |
| *G06F 15/02* | (2006.01) | |
| *G06Q 10/06* | (2012.01) | |
| *G06Q 10/10* | (2012.01) | |

(52) U.S. Cl.
CPC .......... *G06F 3/04883* (2013.01); *G04G 9/0064* (2013.01); *G06F 3/0488* (2013.01); *G06F 15/0266* (2013.01); *G06Q 10/06311* (2013.01); *G06Q 10/109* (2013.01)
USPC .......... 705/7.13; 705/7.18; 705/7.19

(58) Field of Classification Search
None
See application file for complete search history.

(56) References Cited

U.S. PATENT DOCUMENTS

| | | | |
|---|---|---|---|
| 6,587,895 B1 | 7/2003 | Golovchinsky et al. | |
| 2002/0131331 A1 | 9/2002 | Molander | |
| 2002/0196294 A1 | 12/2002 | Sesek | |
| 2004/0021645 A1* | 2/2004 | Kobayashi et al. | 345/173 |
| 2004/0207606 A1* | 10/2004 | Atwood et al. | 345/173 |
| 2005/0280636 A1* | 12/2005 | Hildebrandt et al. | 345/173 |
| 2006/0007785 A1 | 1/2006 | Fernandez et al. | |
| 2008/0143684 A1* | 6/2008 | Seo | 345/173 |
| 2008/0165151 A1* | 7/2008 | Lemay et al. | 345/173 |

FOREIGN PATENT DOCUMENTS

| | | |
|---|---|---|
| EP | 1 091 278 A2 | 4/2001 |
| JP | 08-095695 A | 4/1996 |
| JP | 2001084228 A | 3/2001 |
| JP | 2002342372 A | 11/2002 |
| JP | 10-2007-124499 A | 5/2007 |
| KR | 10-2000-0013269 A | 3/2000 |
| WO | 2006/032721 A1 | 3/2006 |

OTHER PUBLICATIONS

"AwareMedia—A Shared Interactive Display Supporting Social, Temporal, and Spatila Awareness in Surgery", Bardram, Jakob; Hansen, Thomas R.; Soegaard, Mads; Proceedings CSCW 06' Proceedings for the 2006 20th anniversasy conference on Computter supported cooperative work; pp. 109-118, 2006.*

* cited by examiner

*Primary Examiner* — M. Thein
(74) *Attorney, Agent, or Firm* — Jefferson IP Law, LLP

(57) ABSTRACT

An apparatus and method for managing a schedule in a portable terminal are provided. The method includes displaying a user interface including a whiteboard on a standby screen, receiving schedule data from a user through coordinates at which the standby screen is touched, and displaying the received schedule data on the whiteboard.

20 Claims, 5 Drawing Sheets

APPARATUS AND METHOD FOR MANAGING SCHEDULE IN PORTABLE TERMINAL

PRIORITY

This application claims the benefit under 35 U.S.C. §119(a) of a Korean patent application filed in the Korean Intellectual Property Office on May 19, 2008 and assigned Serial No. 10-2008-0045965, the entire disclosure of which is hereby incorporated by reference.

BACKGROUND OF THE INVENTION

1. Field of the Invention

The present invention relates to an apparatus and method for managing a schedule. More particularly, the present invention relates to an apparatus and method for managing a schedule input/output through a whiteboard-type user interface including an analog watch.

2. Description of the Related Art

In general, a portable terminal provides various services for user's convenience. As an example, there is a schedule management service for managing a user's schedule. In the schedule management service, schedules such as engagements, what to do, and commemoration days are received from the user to map and store the schedules in a corresponding date and time. As a result, the schedule management service helps the user to avoid missing scheduled events by informing the events, including the corresponding data and time, to the user.

In a conventional schedule management service, after a user selects an application corresponding to a scheduler on a screen of an idle state, i.e., a standby screen to execute the application, when the user selects a desired date to input a schedule or selects a time of the desired date to input the schedule, the input schedule is displayed on the screen displaying a corresponding date and time using a specific icon. FIG. 1 is a view of a schedule output screen in a conventional portable terminal. As illustrated in FIG. 1, the conventional schedule management service links the input schedule to the specific icon to display the schedule by month, week, or day.

In a conventional schedule management method, since schedule data in which an input process and an output process are differently input is not input as it is but is displayed using an icon, or only summary information is displayed, it is difficult to instinctively recognize the corresponding schedule by the user. Also, in the conventional schedule management method, since a process for inputting the schedule is long and complicated, it is inconvenient to use the method if frequent updates are required.

As a result, persons who are not skilled in the usage of a conventional portable terminal often use a conventional method in which a schedule is easily stored and instinctively recognized by the user, i.e., a method in which the user directly writes the schedule on a paper calendar.

Thus, it is needed to provide a service through which the user can more easily input the schedule in the portable terminal and more instinctively recognize the input schedule.

SUMMARY OF THE INVENTION

An aspect of the present invention is to address at least the above-mentioned problems and/or disadvantages and to provide at least the advantages described below. Accordingly, an aspect of the present invention is to provide an apparatus and method for managing a schedule in a portable terminal.

Another aspect of the present invention is to provide an apparatus and method for managing a schedule which may improve instinctive recognition using a touch screen in a portable terminal.

Still another aspect of the present invention is to provide an apparatus and method for managing a schedule which may simplify an input process using a whiteboard-type user interface in a portable terminal.

In accordance with an aspect of the present invention, a method for managing a schedule in a portable terminal supporting a touch screen is provided. The method includes displaying a user interface including a whiteboard on a standby screen, receiving schedule data from a user through coordinates at which the standby screen is touched, and displaying the received schedule data on the whiteboard.

In accordance with another aspect of the present invention, an apparatus for managing a schedule in a portable terminal supporting a touch screen is provided. The apparatus includes a display unit for displaying a user interface including a whiteboard on a standby screen, a touch sensor for providing coordinates at which the standby screen is touched, and a control unit for controlling such that schedule data input by a user is displayed on the display unit through touch coordinates provided from the touch sensor.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary apparatus and method for receiving and displaying a schedule through a whiteboard-type user interface including an analog watch in a portable terminal will be described.

Figure 1:
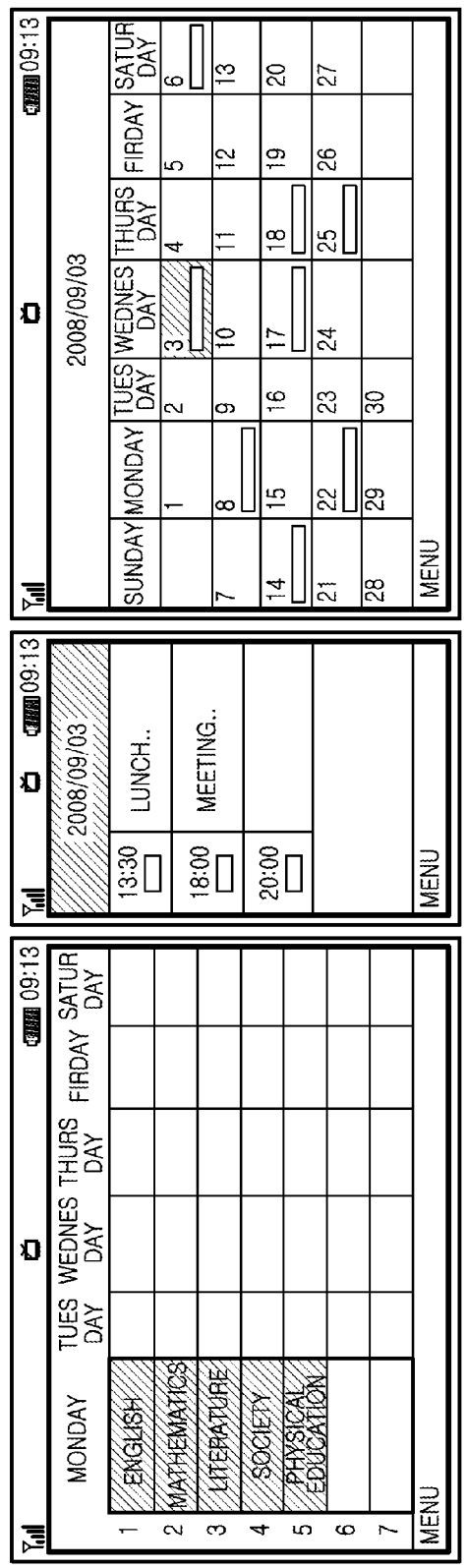
FIG. 1 is a view of a schedule output screen in a conventional portable terminal.
Figure 2:
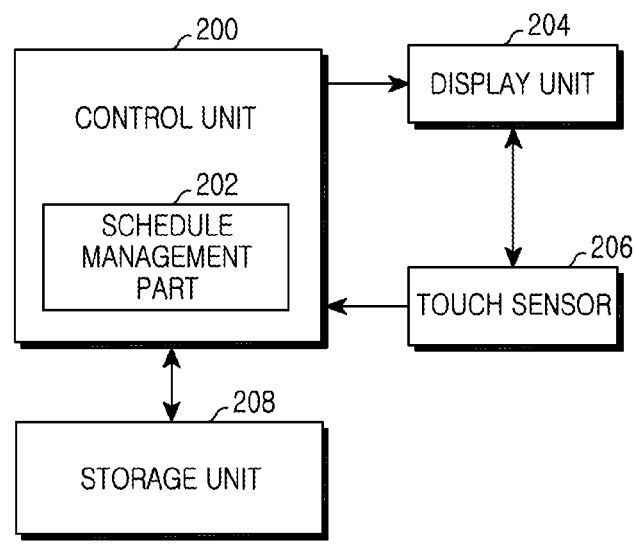
FIG. 2 is a block diagram of a portable terminal according to an exemplary embodiment of the present invention.

FIG. 2 is a block diagram of a portable terminal according to an exemplary embodiment of the present invention.

Referring to FIG. 2, a portable terminal includes a control unit 200, a display unit 204, a touch sensor 206, and a storage unit 208. The control unit 200 includes a schedule management part 202.

The control unit 200 controls and processes overall operations of a portable terminal. Since the control unit 200 includes the schedule management part 202 according to an exemplary embodiment of the present invention, the control unit 200 controls and processes a function for receiving and outputting a schedule through a whiteboard-type user interface. In an exemplary implementation, the whiteboard may also include an analog watch.

The schedule management part 202 controls and processes a function for displaying a whiteboard on the display unit 204 and receives coordinates of a screen touched by a user from the touch sensor 206 to detect whether an event for at least one of adding, deleting, and searching schedule data occurs. When the occurrence of the event for adding the schedule date is detected through the coordinates of the touched screen, the schedule management part 202 controls functions for confirming time information corresponding to the coordinates of the touched screen, mapping data input through the touch sensor 206 with the coordinates and the time information to provide the mapped data to the storage unit 208, and displaying the input data on a corresponding position of display unit 204 as it is. That is, the schedule management part 202 controls functions for recognizing methods (e.g., a touch direction, a touch shape, and a touch frequency) in which the display unit 204 is touched through the touch sensor 206 to recognize the input data and display the recognized data on a contact position as it is.

Also, when the occurrence of the event for deleting the schedule data is detected through the coordinates of the touched screen, the schedule management part 202 controls and processes a function for activating a data deletion icon (e.g., an icon having an eraser shape) to delete the data mapped in the coordinates of the contact position touched by the user. In addition, when the occurrence of the event for searching the schedule data is detected through the coordinates of the touched screen, the schedule management part 202 controls and processes a function for determining the touch direction and time to search a corresponding schedule data from the storage unit 208 and display the schedule data on the display unit 204.

The display unit 204 displays the status information of the portable terminal, numerals and characters, a large amount of moving pictures and still pictures, and so on. Specifically, the display unit 204 according to an exemplary embodiment of the present invention displays a whiteboard including an analog watch under the control of the control unit 200 to display the schedule data input by the user.

The touch sensor 206 may provide a plurality of functional keys such as keys provided on a conventional keypad. Also, the touch sensor 206 recognizes an operation touched on the display unit 204 to perform a corresponding function. That is, the touch sensor 206 provides the coordinates corresponding to the contact position of the screen touched by the user to the control unit 200 and recognizes the touch methods, e.g., the touch direction, the touch shape, and the touch frequency to provide the touch methods to the control unit 200.

The storage unit 208 includes a program memory, a data memory, and a nonvolatile memory to store temporary data generated during operations of the portable terminal, system parameters, backup data, and the like. Specifically, the storage unit 208 stores a table including time information corresponding to each of coordinates of the touch screen according to an exemplary embodiment of the present invention. In addition, the storage unit 208 stores the schedule data provided from the control unit 200 and the touch coordinates and the time information mapped in the schedule data according to an exemplary embodiment of the present invention.

Figure 3A:
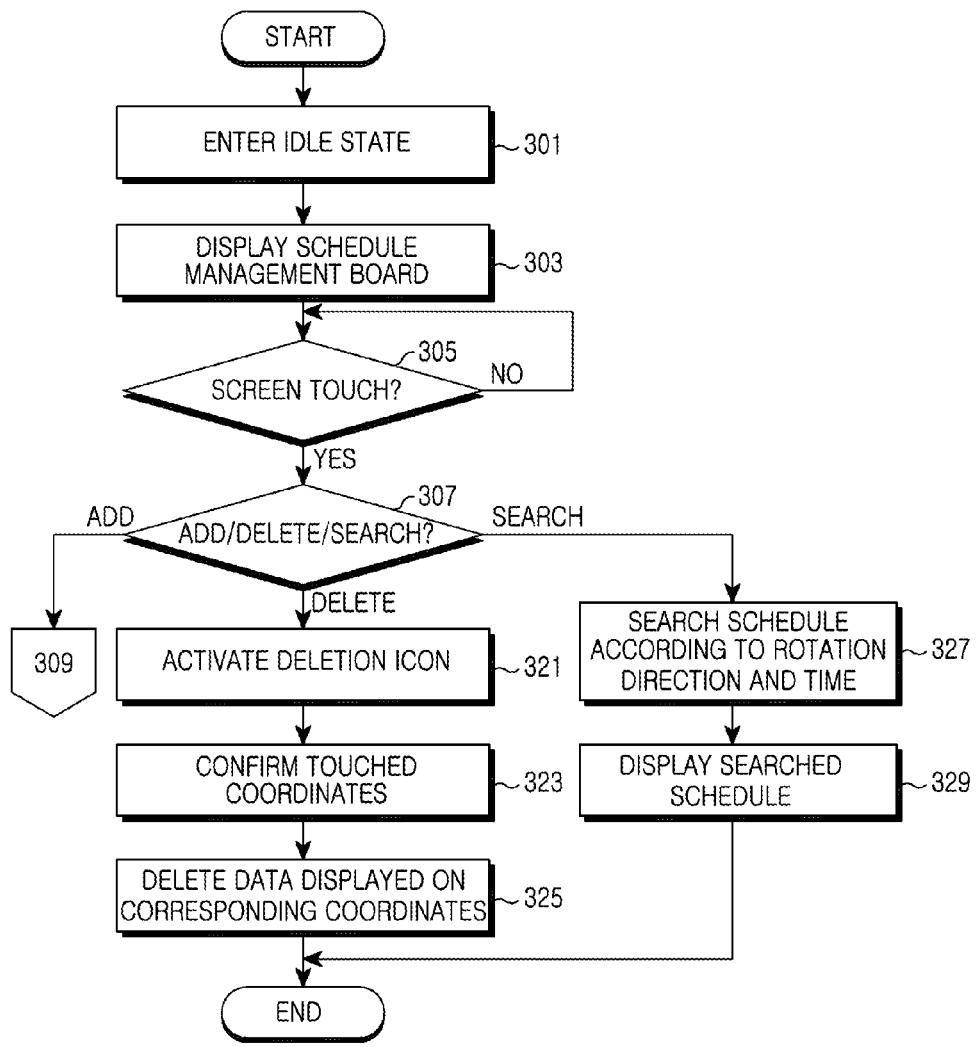
FIGS. 3A and 3B are flowcharts of a process for managing a schedule in a portable terminal according to an exemplary embodiment of the present invention.
Figure 3B:
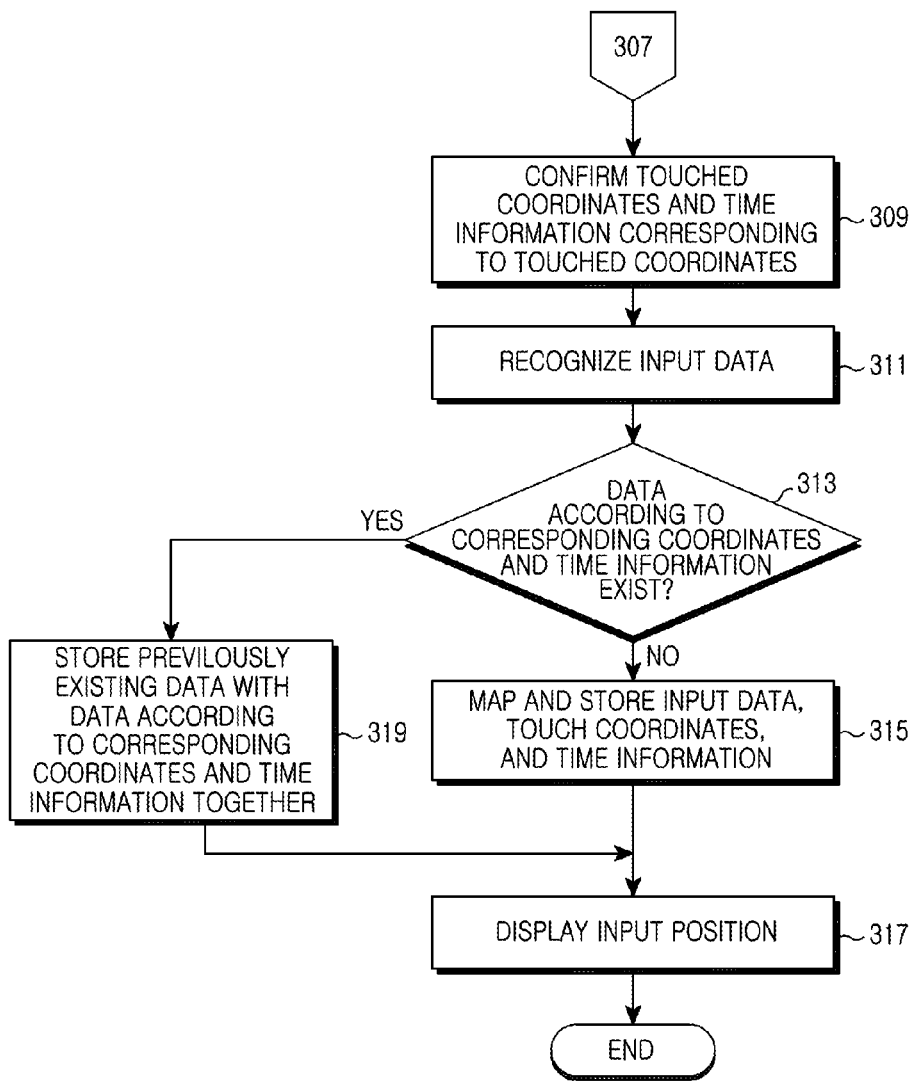

FIGS. 3A and 3B are flowcharts illustrating a process for managing a schedule in a portable terminal according to an exemplary embodiment of the present invention.

Referring to FIGS. 3A and 3B, when the portable terminal enters an idle state in step 301, the portable terminal displays a user interface including a whiteboard on a standby screen in step 303.

In step 305, the portable terminal determines whether the screen is touched by a user. When the screen is touched, the portable terminal proceeds to step 307 to determine whether an occurrence of an event for at least one of adding, deleting, and searching schedule data is detected through coordinates corresponding to a contact position of the screen. For example, when the coordinates of the contact position are coordinates corresponding to a portion in which the analog watch is displayed, the portable terminal may detect that the event for searching the schedule data occurs. Also, when the coordinates of the contact position correspond to a portion in which a data deletion icon (e.g., an icon having an eraser shape) is displayed, the portable terminal may detect that the event for deleting the schedule data occurs. In addition, when the coordinates of the contact position are coordinates corresponding to a background portion of the whiteboard, the portable terminal may detect that the event for adding the schedule data occurs.

Figure 4:
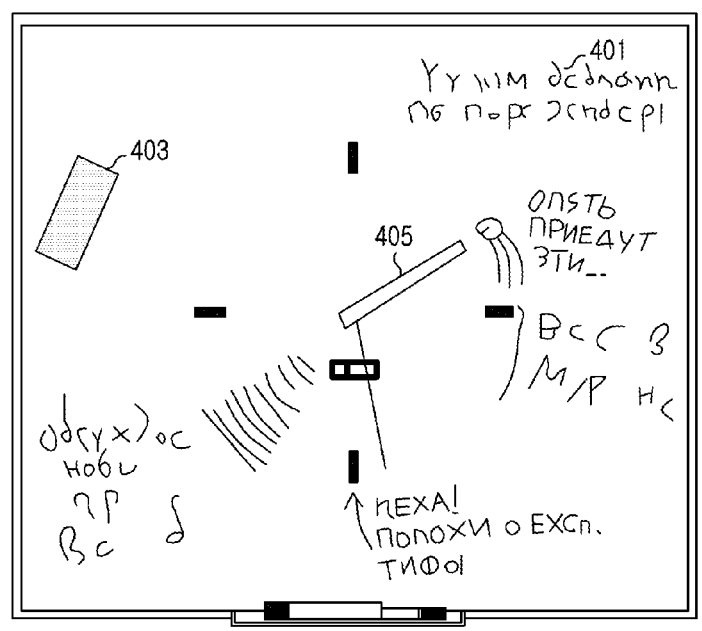
FIG. 4 is a view of a whiteboard-type user interface for managing a schedule in a portable terminal according to an exemplary embodiment of the present invention.

When the occurrence of the event for adding the schedule data is detected, the portable terminal proceeds to step 309 to confirm the coordinates at which the screen is touched and the time information corresponding to the touched coordinates. For example, as illustrated in FIG. 4, when the touched coordinates (x, y) correspond to the background portion 401 of the whiteboard, the portable terminal detects that the event for adding the schedule date occurs and confirms that the time information corresponding to the touched coordinates is three o'clock.

In step 311, the portable terminal determines the method (e.g., a touch direction, a touch shape, and a touch frequency) in which the screen is touched to recognize the input data.

In step 313, the portable terminal determines whether input data having the touched coordinates and the time information exists. When the input data having the touched coordinates and the time information does not exist, the portable terminal maps and stores the recognized input data in the touched coordinates and the time information in step 315. In step 317, the portable terminal displays the mapped data on the contact position as it is. In contrast, when the input data having the touched coordinates and the time information exists, the portable terminal proceeds to step 319 to map and store previously existing input data and the recognized input data. The portable terminal proceeds to step 317 to display the recognized input data on the contact position. At this time, the portable terminal may display all of the input data or only a portion of the input data. When all of the input data is displayed, the input data may be adjusted in size to display the size-adjusted data.

Thereafter, the portable terminal terminates the process.

Referring again to step 307, when the occurrence of the event for deleting the schedule data is detected, the portable terminal proceeds to step 321 to activate a data deletion icon. For example, as illustrated in FIG. 4, when the touched coordinates (x, y) correspond to a portion in which the data deletion icon 403 is displayed, the portable terminal detects that the event for deleting the schedule data occurs to activate the data deletion icon.

Thereafter, the portable terminal confirms the coordinates at which the screen is touched in step 323 and deletes the schedule data displayed on the confirmed coordinates, i.e., the input data, in step 325. At this time, the portable terminal deletes data input in a corresponding position while the activated data deletion icon is moved and displayed according to the direction or shape in which the screen is touched. That is, similar to an eraser function used for erasing an image in a conventional image editing program, the user may drag the data deletion icon through a touch screen to delete the whole or a portion of the input schedule data.

Thereafter, the portable terminal terminates the process according to an exemplary embodiment of the present invention.

When the occurrence of the event for searching the schedule data is detected, the portable terminal recognizes the direction in which the screen is touched, i.e., a direction in which the touch rotates and confirms time information according to the rotation direction of the touch to search a corresponding schedule in step 327. And then, in step 329, the searched schedule is displayed. For example, as illustrated in FIG. 4, when the touched coordinates (x, y) correspond to a portion on which an hour hand 405 of the analog watch is displayed, the portable terminal detects that the event for searching the schedule data occurs. When the touch rotates in a clockwise direction, the portable terminal searches and displays a schedule mapped in the future with respect to the current time, i.e., input data. At this time, the portable terminal may sequentially display schedule data mapped in the future or the past corresponding to a direction in which the touch rotates such as clockwise or counter-clockwise, or list the schedule data to display the listed schedule data. Also, the portable terminal may display schedule data corresponding to time information of coordinates at which the touch stays considering to the coordinates stayed while the touch rotates.

Thereafter, the portable terminal terminates the process according to an exemplary embodiment of the present invention.

According to exemplary embodiments of the present invention, the portable terminal including the touch screen receives the schedule using the whiteboard-type user interface including the analog watch to display the received schedule. Thus, when compared to the conventional schedule management method, the schedule management method according to exemplary embodiments of the present invention can instinctively recognize the input data and improve utilization of the touch interface.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing a schedule in a portable terminal supporting a touch screen, the method comprising:
    displaying a user interface including a whiteboard on a standby screen;
    receiving schedule data from a user through coordinates at which the standby screen is touched; and
    displaying the received schedule data on the whiteboard,
    wherein the receiving schedule data comprises confirming the coordinates at which the standby screen is touched and time information corresponding to the coordinates at which the standby screen is touched, and
    wherein the displaying of the received schedule data comprises displaying the schedule data in a position corresponding to a contact position of the coordinates at which the standby screen is touched and the time information corresponding to the coordinates at which the standby screen is touched.

2. The method of claim 1, wherein the user interface further comprises at least one of an analog watch and a data deletion icon.

3. The method of claim 1, wherein the receiving of the schedule data comprises:
    detecting a touch method to recognize the received schedule data; and
    mapping the recognized schedule data in coordinates and the corresponding time information to store the mapped schedule data.

4. The method of claim 3, wherein the touch method comprises at least one of a touch direction, a touch shape, and a touch frequency.

5. The method of claim 1, further comprising determining whether an event for at least one of adding, deleting, and searching the schedule data occurs through the coordinates at which the standby screen is touched.

6. The method of claim 5, further comprising:
    when the occurrence of the event for adding the schedule data is determined through the coordinates at which the standby screen is touched, determining whether input data having the touched coordinates and the time information exists, if it is determined that the input data having the touched coordinates and the time information exists, mapping and storing previously existing input data and the received schedule data.

7. The method of claim 6, further comprising, if it is determined that the input data having the touched coordinates and the time information does not exist, mapping and storing the received schedule data and the time information.

8. The method of claim 5, further comprising:
    when the occurrence of the event for deleting the schedule data is determined through the coordinates at which the standby screen is touched, confirming the coordinates on which the standby screen is touched, and deleting the schedule data displayed on the confirmed coordinates.

9. The method of claim 8, wherein the deleting of the schedule data comprises:
    deleting the schedule data displayed on the confirmed coordinates while a data deletion icon is moved and displayed according to a direction and shape in which the standby screen is touched.

10. The method of claim 5, further comprising:
when the occurrence of the event for searching the schedule data is determined through the coordinates at which the standby screen is touched, recognizing a direction in which the standby screen is touched, confirming time information according to a rotation direction of the touch, and searching schedule data corresponding to the time information to display the schedule data.

11. An apparatus for managing a schedule in a portable terminal supporting a touch screen, the apparatus comprising:
a display unit for displaying a user interface including a whiteboard on a standby screen;
a touch sensor for providing coordinates at which the standby screen is touched; and
a control unit for controlling such that schedule data input by a user is displayed on the display unit through touch coordinates provided from the touch sensor,
wherein the control unit confirms the coordinates at which the standby screen is touched and time information corresponding to the coordinates at which the standby screen is touched, and controls displaying the schedule data in a position corresponding to a contact position of the coordinates at which the standby screen is touched and the time information corresponding to the coordinates at which the standby screen is touched.

12. The apparatus of claim 11, wherein the user interface further comprises at least one of an analog watch and a data deletion icon.

13. The apparatus of claim 11, wherein the control unit detects a touch method to recognize the input schedule data, and maps the recognized schedule data in the touched coordinates and corresponding time information to store the mapped schedule data.

14. The apparatus of claim 13, further comprising a storage unit for storing a table including the time information corresponding to the coordinates of the standby screen and storing the mapped schedule data, the touch coordinates, and the corresponding time.

15. The apparatus of claim 13, wherein the touch method comprises at least one of a touch direction, a touch shape, and a touch frequency.

16. The apparatus of claim 11, wherein the control unit determines whether an event for at least one of adding, deleting, and searching the schedule data occurs through the coordinates at which the standby screen is touched.

17. The apparatus of claim 16, wherein, when the occurrence of the event for adding the schedule data is determined through the coordinates on which the standby screen is touched, the control unit determines whether the input data having the touched coordinates and the time information exists, and, if it is determined that the input data having the touched coordinates and the time information exists, maps and stores previously existing input data and the received schedule data.

18. The apparatus of claim 16, wherein, when the occurrence of the event for deleting the schedule data is determined through the coordinates on which the standby screen is touched, the control unit controls such that the schedule data displayed on the coordinates at which the standby screen is touched is deleted.

19. The apparatus of claim 18, wherein the control unit controls such that a data deletion icon is moved and displayed according to a direction and shape in which the standby screen is touched.

20. The apparatus of claim 16, wherein, when the occurrence of the event for searching the schedule data is determined through the coordinates on which the standby screen is touched, the control unit controls such that the control unit confirms time information according to a direction in which the standby screen is touched and searches schedule data corresponding to the time information to display the searched schedule data.

* * * * *